UNITED STATES PATENT OFFICE.

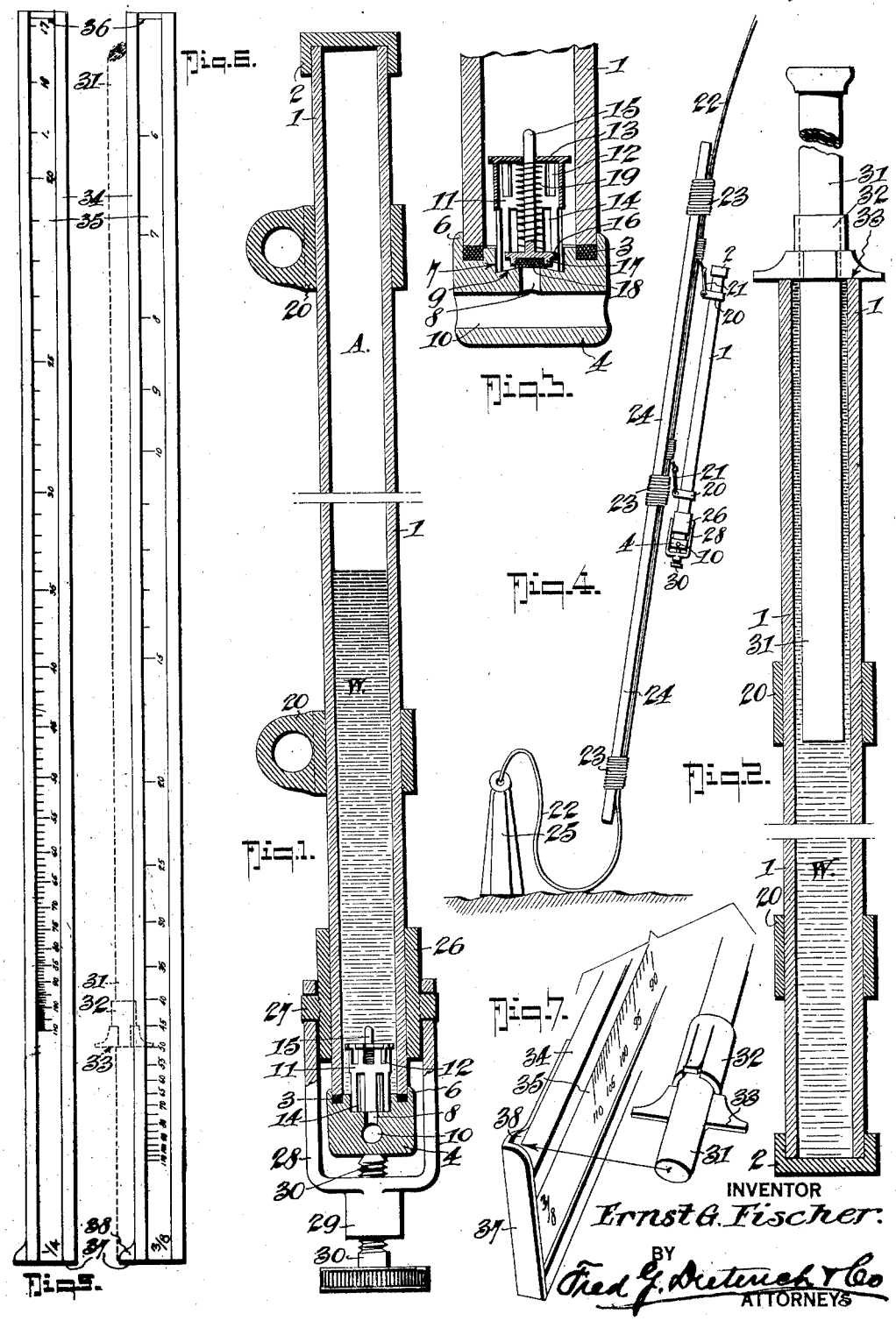

ERNST G. FISCHER, OF WASHINGTON, DISTRICT OF COLUMBIA.

SOUNDING APPARATUS.

1,349,718.  Specification of Letters Patent.  Patented Aug. 17, 1920.

Application filed January 11, 1919. Serial No. 270,714.

*To all whom it may concern:*

Be it known that I, ERNST G. FISCHER, a citizen of the United States, at present residing at Washington, in the District of Columbia, have invented certain new and useful Improvements in Sounding Apparatus, of which the following is a specification.

My present invention is in the nature of an improvement on the apparatus disclosed in my U. S. Patent No. 1,244,485, issued October 30, 1917, and it especially has for its object to provide a more convenient, effective and accurate way of determining the depth of the soundings.

It has been found, in practice, that, when the rod by which the water is displaced from the sounding tube is, itself, graduated with a scale from which the depth reading is taken, there is room for error due to the closeness of the indicating marks and the capillary action of the water obscuring the marks, and that the reading of a close scale and its numbers on a cylindrical surface of bright metal is too difficult, especially so at night and in stormy weather.

It is, therefore, another object of the present invention to provide means whereby the displacement rod can be inserted into the sounding tube and as soon as the displaced water reaches the mouth of the tube, an indicator on the rod will have been set so that the rod can immediately be removed and the tube at once used again, if desired.

The depth of the sounding can be taken by placing the rod on a coöperating scale bar, which is a separate article from the rod, but is graduated with definite regard to the rod volume and with definite regard to the sounding tube and its valve device.

In its more detailed nature, the invention also includes those novel features of construction, combination and arrangement of parts, all of which will be first fully described and then be specifically pointed out in the appended claims, reference being had to the accompanying drawings, in which:

Figure 1 is a vertical longitudinal section of one of my instruments showing the same as having been lowered to effect a sounding, the water being indicated by W and the air-spring by A.

Fig. 2 is a central vertical longitudinal section of the tube inverted with the cap removed, and the displacement rod introduced sufficiently to bring the water to the mouth or outlet of the tube and give the proper position to the slide indicator on the rod.

Fig. 3 is a detail longitudinal section of the lower end of the sounding tube with the removable cap in place.

Fig. 4 is a side elevation showing the device in use.

Figs. 5 and 6 are elevations of two scale bars, one for a ¼ inch rod and the other for a ⅜ inch rod.

Fig. 7 is a detail perspective view of one end of a scale bar and its coöperating displacement rod.

In the drawings, in which like numerals and letters of reference indicate like parts in all of the figures, 1 represents a section of brass tubing which, in practice, is preferably two feet long and of an internal diameter of say ½ inch, although the length and diameter of tubing employed are a matter of design and I do not wish to be limited to any particular dimensions.

The upper end of the tube 1 is closed by a cap 2, which is soldered or otherwise permanently fastened in place, while the lower end of the tube 1 is designed to receive a cap 4, the construction of which and of the valve coöperating with it, is best indicated in Fig. 3 of the drawings, by reference to which it will be noticed that the cap 4 is provided with a recess 5 and also has a flange 6 to receive the lower end of the tube 1, a packing or washer 3 being located in the recess 5 and forming a seat for the lower end of the tube 1. The seat end of the tube 1 is adapted to be held with sealing pressure against the washer 3 by the clamp screw 30 which is carried in the boss 29 of the yoke 28 that is mounted on trunnions 27 of the fixed sleeve 26.

The cap 4 is counterbored at 7 and has an inclined or coniform valve seat 9 around the bore 8 through which the water is designed to enter the tube.

The bore 8 communicates with a cross bore 10 in the cap.

In practice, the cubical content of the counterbore 7 is designed to equal the cubical content of the material forming the valve cage, the valve and valve spring, so that the displacement of water due to the volume of these parts in the tube 1, will be compensated for by the additional space in the counterbore 7. Thus when water has entered the tube 1, in use, the reading of the water level will not be effected by reason of the displacement due to the valve cage and its parts.

11 designates the valve cage which consists of a metallic cylinder slotted at 12 and 14 to permit free passage of water and provided with a valve stem bearing 13, the cylinder 11 being slotted at its lower end, as at 14, so that it may be seated in the counterbore 7 with retaining friction.

15 is the valve stem which is provided with winged guides 16 and a receptacle 17 for the valve disk 18. The disk 18 is preferably formed of a rubber composition.

The valve spring 19 continuously tends to seat the valve.

In order to standardize the instrument and provide a definite way of compensating the reading on the scale bar for the action of the spring, I prefer to make the spring of a definite strength so that its force added to the weight of the valve, will have a definite value at all times. I have selected for this value, the pressure exerted by the water through the aperture 8, when the instrument is immersed to the depth of one fathom, i. e. the tension of the spring is such that the valve will not begin to open until the instrument reaches a depth of one fathom. Therefore, the water which enters the tube at greater depths than one fathom is less than that which would enter the tube were the value of the spring and valve-weight zero. Allowance for this is made in graduating the scale bar hereinafter described.

In practice, the parts are assembled as indicated in Fig. 1, the cap being tightly secured onto the end of the tube and the tube being empty of fluid (except air). The air is at atmospheric pressure and the valve is seated under the influence of its weight and the force of the spring 19.

As the instrument is lowered and a depth of one fathom is reached, the pressure of the water causes water to enter through the bores 10 and 8 into tube 1, opening the valve against the resistance of the valve spring and the resistance of the air spring in the tube.

The amount of water which will be forced into the tube and the amount to which the air in the tube will be compressed, will depend upon the depth to which the instrument is lowered. As the instrument is being lowered, the pressure within the same and that on the outside of the instrument tend to become balanced and were it not for the provision of the spring 19, the valve would not immediately seat, so that if the instrument were drawn up slowly enough, the valve would remain unseated and the water from the inside of the tube would flow out again.

Of course, if a quick pull on the instrument to raise it is had, the valve would seat by reason of the difference of pressure formed by such quick action, but as before stated, if the withdrawal be very slow, there is danger of leakage and hence I have provided the spring 19 of a definite pressure action or force to hold the valve on its seat with sufficient pressure to maintain the sealing contact even though the instrument be drawn up slowly.

In practice, the instrument is held with clamps 20 by snap hooks 21 of the ordinary type that are on the stray line 22, the stray line being provided with a stiffening stick 24 which is secured to it at intervals 23 to protect the instrument by preventing the bottom of the sounder from striking. The stray line also carries the lead 25, as is the usual practice.

In order to effect a reading of the instrument, after it has been withdrawn, the instrument is turned upside down and the cap 4 removed. After the cap has been removed, a rod 31 is introduced (see Fig. 2) until the water level reaches the mouth of the tube 1. The rod is of uniform cross section throughout and of a definite volume. It has a sliding sleeve 32 held with friction, the sleeve having a straight edge 33 to engage the mouth of the tube 1 and thus fix the place on the rod that determines the depth of immersion, so that, when the rod is placed on its coöperative scale bar, a direct indication of the depth of the immersion can be taken from the scale.

After the rod 31 has been inserted to the proper depth in the tube, it is removed and the water is emptied out of the tube and the cap replaced.

The instrument is then ready for use a second time.

In practice, when the tube 1 is of one-half inch inside diameter, (the diameter I prefer to use) I prefer also to provide the navigator with a series of rods and scale bars, say three sets, i. e. a $\frac{1}{4}$ inch rod and a corresponding scale bar, a $\frac{5}{16}$ inch rod and a corresponding scale bar, and a $\frac{3}{8}$ inch rod and a corresponding scale bar, each scale bar being graduated to read fathoms determined by the particular rod with which it coöperates, thus making it quite convenient for the navigator to read practically any depth to which the instrument has been lowered, it being understood, of course, that, at the shallower depths, less water enters the tube 1 than at the greater depths and hence for measuring shallow depths, the largest rod would be employed, since the water in the tube 1 has to be displaced through a greater distance before it reaches the level of the mouth of the tube.

After the rod 31 has been inserted in the sounder tube 1 and the water displaced thereby, reaches the end of the tube, the navigator removes the rod, and places it, as indicated in dotted lines on Fig. 6, on the corresponding scale bar 34.

The bar 34 has a scaled surface graduated in units to read fathoms from the minimum at 36 toward the maximum at the opposite extremity of the bar. The bar has an end plate 37 which has an abutment or recess-like portion 38 to receive the end of the rod 31, while the indicator 33 is designed to lie over the bar 34 and scaled surface 35 and form a pointer by which the scale reading may be observed at a glance.

In graduating the scales 35, allowance is made for the pressure of the valve spring and the weight of the valve. For instance, the six fathom mark on the scale (Fig. 6) is really the indication of the water which would enter the tube 1 under five fathom pressure were the pressure of the valve and the valve spring zero, hence there is a definite relation between the sounder, the displacement rod and the scale bar.

It should be understood, if the sounder is lost, as sometimes occurs when the lead fouls and the line or sounding wire breaks, the navigator does not lose his indicator rods or scale bars, as one set of indicating rods and scale bars can be used in connection with a plurality of sounding instruments, thus making the expense for the loss of the instrument much less than is the case with those instruments on the market in which the indicators are an attached part of the instrument.

With my construction, it will be seen that I provide a positive means for trapping the water and fully preventing any leakage of the same, thus rendering the instrument of special value in survey work, where great accuracy is required.

I also provide a scale, the parts of which, being multiplied by the ratio of the cross sectional area of the measuring rod and that of the sounding tube, are much larger and therefore more easily read under adverse conditions than the scales of other similar apparatus.

I have provided a suitable correction table for the use of the navigator where extreme accuracy is desired, as in survey work, the table giving the proper corrections for variation in the temperature of the air and water and variations in the barometric pressure.

The sounder proper described and shown in Figs. 1, 3 and 4, is, in its essentials, the same as that disclosed in my prior patent above referred to and I make no claim herein, *per se*, to the parts shown in Figs. 1, 3 and 4.

From the foregoing description taken in connection with the accompanying drawings, it is thought the complete construction, operation and advantages of my invention will be readily understood by those skilled in the art.

What I claim is:

1. In a sounder of the class described wherein is provided, a sounding tube of definite volume adapted to receive water, when the sounder is immersed, and having provision for retaining the water under the pressure of immersion until the sounding tube has been drawn up; a rod of definite volume adapted to be inserted into the sounding tube, when opened, to displace the water to a given extent, and an indicator slidable on the rod and adapted to be set by contact with the end of the sounder tube as the rod is inserted in said tube, and a separate scale bar adapted to receive said rod and coöperate with said indicator to give the necessary reading of the depth of immersion.

2. In a sounder of the class described wherein is provided, a sounding tube of definite volume adapted to receive water, when the sounder is immersed and having provision for retaining the water under the pressure of immersion until the sounding tube has been drawn up; a rod of definite volume adapted to be inserted into the sounding tube, when opened, to displace the water to a given extent, and an indicator slidable on the rod and adapted to be set by contact with the end of the tube as the rod is inserted in said tube, and a separate scale bar adapted to receive said rod and coöperate with said indicator to give the necessary reading of the depth of immersion, said scale bar having one end provided with a rod stop and having a scale surface over which the said indicator may lie to coöperate with the scale marks.

3. In an apparatus of the class described, a scale bar having a straight edge and an end stop, a displacement rod adapted to lie with one end against said stop and along said straight edge, and a slidable indicator on the rod having a straight edge to lie over the scale bar and coöperate with the graduation marks of the same.

4. In a sounder of the class described, wherein is provided a sounding tube of definite volume adapted to receive water, when the sounder is immersed and having provision for retaining the water under the pressure of immersion until the sounding tube has been drawn up; a rod of definite volume adapted to be inserted into the tube, when opened, to displace the water to a given extent, and an indicator slidable on the rod and adapted to be set by contact with the end of the tube as the rod is inserted in said tube, and a scale bar adapted to receive said rod and coöperate with said indicator to give the necessary reading of the depth of immersion, said scale bar having one end provided with a rod stop and having a scale surface over which the said indicator may lie to coöperate with the scale marks, said scale surface being graduated in single fathom units.

ERNST G. FISCHER.